April 29, 1930. E. O. LINDBERG 1,756,064
STERILE INDICATING MEANS IN STERILIZING THERMOMETERS
Filed May 24, 1928

Inventor
Ernest O. Lindberg
By his Attorney

Patented Apr. 29, 1930

1,756,064

UNITED STATES PATENT OFFICE

ERNEST O. LINDBERG, OF JAMAICA, NEW YORK, ASSIGNOR TO THE KNY-SCHEERER CORPORATION OF AMERICA, OF NEW YORK, N. Y., A CORPORATION OF NEW YORK

STERILE INDICATING MEANS IN STERILIZING THERMOMETERS

Application filed May 24, 1928. Serial No. 280,188.

My invention relates to an improvement in the combination of a sterile indicating means in a sterilizing thermometer and the novelty lies in the adaptation and arrangement of parts as will be more fully hereinafter pointed out.

When water and other liquids are being sterilized for use in sterilizers it frequently occurs that the nurse in charge of sterilization will fill the tanks to be sterilized at night before going off duty with the idea of immediately sterilizing the contents of such tanks in the morning upon assuming duty. The night nurse or nurses in such cases falling short of sterilized material may go to the sterilizer to secure what they think is sterilized water or other liquid and not knowing that it is not sterilized use it on the patient with bad if not fatal results. This difficulty has become so serious in many hospitals that the nurses on leaving the sterilizing apparatus frequently resort to sticking strips of adhesive plaster on the various tanks marking them sterile or not sterile in accordance with their condition. This practice has also been found dangerous as the strips sometimes fall off and no safe indicating means is available and as is well known it is not possible to make any quick test of the contents of the tanks to determine if they are sterile or not. Also this practice of marking the tanks by the use of strips of adhesive plaster is not sanitary and tends to injure the exterior of the sterilizing tanks on which they are used.

There is therefore a most serious problem of indicating if the contents of sterilizing tanks are sterile or not sterile and this problem has existed for many years in the hospitals without a satisfactory solution although doctors and nurses and those engaged in the manufacture of sterilizers have realized this problem during these many years.

My device has solved this problem in a simple and positive manner furnishing the operator or those using the sterilizer with definite information if the contents of a sterilizer is sterile or warning them in no uncertain manner if the contents of the sterilizer is not sterile.

Referring to the drawings Figures 1 and 2 are front elevations of my device indicating cold and hot sterile tanks with the unnecessary portions of the sterilizer being broken away for convenience in illustration.

Figure 1:
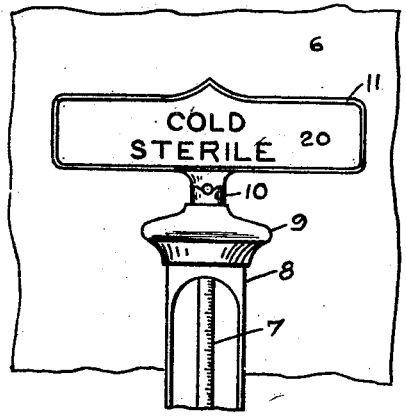
Figure 2:
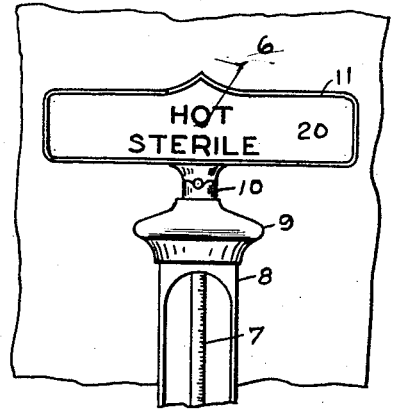
Figure 3:
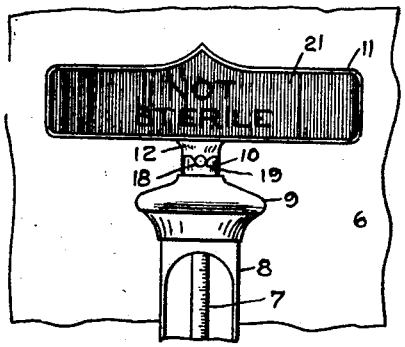
Figures 3 and 4 are the same as Figures 1 and 2 respectively with the indicating means reversed in each case.
Figure 4:
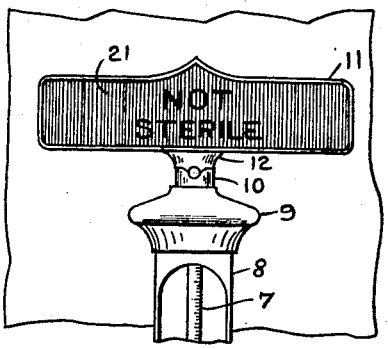
Figure 5:
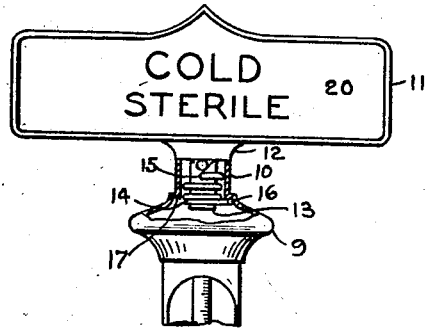
Figure 5 is an enlargement of the thermometer and indicating means of Figure 1, a portion being broken away to show the interior construction.

In the drawings 6 is a sterilizer tank on which is mounted in the usual well known manner a thermometer 7 in a thermometer casing of usual construction 8 which terminates in its upper portion in a head portion 9 and a cylindrical sleeve portion 10. An indicating plate 11 terminates at its base in a tapered circular shoulder portion 12 which is adapted to rest on the cylindrical portion 10 of the thermometer casing 8. The indicating plate 11 also has a cylindrical spindle 13 which is rigidly mounted in the circular shoulder 12. A spiral spring 14 of usual construction is mounted around said cylindrical spindle 13 being fastened therethrough at its upper end at 15 and the lower end of said spiral spring 14 is formed in a larger spiral 16 which is adapted to engage under the edge of a shoulder 17 formed at the junction of the head 9 with the cylindrical sleeve portion 10 whereby the spindle 13 and the indicating plate 11 carried thereon is mounted under constant downward spring tension of the spring 14. A cross pin 18 is rigidly mounted through the spindle 13 and is adapted to sink in cross slots 19 cut in the edge of the cylindrical sleeve portion 10.

It is to be particularly noted that the indicating plate 11 has a clear indicating side 20 on the sterile indicating side and a danger or red indication 21 on the not sterile side.

In operating my device when the operator fills the sterilizer with fresh liquid to be sterilized at the same time the operator will turn the indicator 11 so that the red or danger side 21 shows and anyone approaching the sterilizer is immediately warned thereby that this sterilizer contains material which has not been sterilized. When the sterilization has been completed in said sterilizer the operator will then turn the indicator 11 around half way so that the clear or sterile face 20 will indicate to anyone approaching the sterilizer that the contents of said sterilizer are sterile and ready for use. As the operator turns the indicator 11 by the handle it will be slightly pulled upwardly so as to release the cross pin 18 from the cross sockets 19 whereby the indicator 11 can be turned half way around until the cross pin 18 will again register in the cross sockets 19 but with the reverse side of the indicator 11 then presenting itself to anyone approaching the sterilizer. The spring 14 locking under the shoulder 17 at 16 maintains the cross pin 18 in the engaged position in the cross sockets 19 thereby effecting a locking of the indicator 11 in the desired indicating position against accidental dislodgment.

It is apparent that many variations may be made in the construction and arrangement of the parts without departing from the spirit and intent of the same as defined by the claims.

I claim:

1. A hollow cap adapted to encase the upper end of a sterilizer thermometer and housing a spindle carrying a sterile indicating means thereon under constant downward spring tension therein, a cross pin mounted through said spindle and adapted to engage a seat in the upper edge of said cap, whereby a sterile and unsterile indicating means is combined in a sterilizer thermometer.

2. A hollow cap adapted to encase the upper end of a sterilizer thermometer and housing a spindle carrying a sterile indicating means thereon under constant downward spring tension therein, a cross pin mounted through said spindle and adapted to seat in a seat in the upper edge of said cap, said seat having curved shoulders whereby said pin can be rolled out of said seat engagement by rotating said indicating means and its spindle whereby a sterile and unsterile indicating means is operated through the operation of the head of a sterilizing thermometer.

In testimony whereof I affix my signature.

ERNEST O. LINDBERG.